US007595484B2

(12) United States Patent
Yokosuka et al.

(10) Patent No.: US 7,595,484 B2
(45) Date of Patent: Sep. 29, 2009

(54) MASS SPECTROMETRIC METHOD, MASS SPECTROMETRIC SYSTEM, DIAGNOSIS SYSTEM, INSPECTION SYSTEM, AND MASS SPECTROMETRIC PROGRAM

(75) Inventors: Toshiyuki Yokosuka, Hitachi (JP); Kinya Kobayashi, Hitachi (JP); Kiyomi Yoshinari, Hitachi (JP); Atsushi Otake, Hitachiohta (JP); Atsumu Hirabayashi, Kodaira (JP); Yasushi Terui, Tsuchiura (JP)

(73) Assignee: Hitachi High-Technologies Corp., Tokyo (JP)

( * ) Notice: Subject to any disclaimer, the term of this patent is extended or adjusted under 35 U.S.C. 154(b) by 63 days.

(21) Appl. No.: 11/315,162

(22) Filed: Dec. 23, 2005

(65) Prior Publication Data

US 2006/0169889 A1 Aug. 3, 2006

(30) Foreign Application Priority Data

Dec. 24, 2004 (JP) ............................ 2004-373475

(51) Int. Cl.
*B01D 59/44* (2006.01)

(52) U.S. Cl. ........................ 250/282; 250/281; 250/288

(58) Field of Classification Search ................. 250/281, 250/282, 288; 436/173; 702/27
See application file for complete search history.

(56) References Cited

U.S. PATENT DOCUMENTS

| | | | | |
|---|---|---|---|---|
| 6,107,623 | A * | 8/2000 | Bateman et al. | 250/282 |
| 6,745,134 | B2 * | 6/2004 | Kobayashi et al. | 702/27 |
| 6,917,037 | B2 * | 7/2005 | Ootake et al. | 250/282 |
| 2004/0169138 | A1 * | 9/2004 | Ootake et al. | 250/281 |
| 2004/0181347 | A1 * | 9/2004 | Yoshinari et al. | 702/27 |
| 2004/0195500 | A1 * | 10/2004 | Sachs et al. | 250/282 |
| 2005/0098719 | A1 * | 5/2005 | Thomson | 250/288 |
| 2005/0167582 | A1 * | 8/2005 | Zavitsanos et al. | 250/282 |
| 2005/0178963 | A1 * | 8/2005 | Londry et al. | 250/293 |

FOREIGN PATENT DOCUMENTS

JP 2000-266737 9/2000

* cited by examiner

*Primary Examiner*—David A Vanore
*Assistant Examiner*—Michael Maskell
(74) *Attorney, Agent, or Firm*—Mattingly & Malur, P.C.

(57) ABSTRACT

The present invention can provide a mass spectrometric system judging whether a measurement target is a substance required by an operator within an actual measurement time, when a substance (particularly such as protein or sugar chains) is analyzed. In the mass spectrometric system using a tandem mass spectrometer, a particular substance obtained by separating a sample is ionized, and mass analysis of the ionized substance is performed to obtain a spectrum. This spectrum is compared with a particular spectrum stored in advance, to thereby determine whether both the spectra match with each other. When a match is determined, a particular ion is further ionized within a particular time for detailed analysis. The invention also provides a mass spectrometric method, a diagnosis system and an inspection system each using the mass spectrometric system, and a program for operating a computer to control those systems with desired functions.

18 Claims, 10 Drawing Sheets

MASS SPECTROMETRIC METHOD, MASS SPECTROMETRIC SYSTEM, DIAGNOSIS SYSTEM, INSPECTION SYSTEM, AND MASS SPECTROMETRIC PROGRAM

BACKGROUND OF THE INVENTION

1. Field of the Invention

The present invention relates to a mass spectrometric method and a mass spectrometric system. Also, the present invention relates to a diagnosis system and an inspection system each using the mass spectrometric system, and to a mass spectrometric program.

2. Description of the Related Art

Mass spectrometry is divided into a method of performing mass analysis just after ionizing a sample (MS method), and a tandem mass spectrometric method of selecting a particular sample ion (parent ion) in terms of mass, and then performing mass analysis of dissociated ions produced by dissociating the selected sample ion. The tandem mass spectrometric method has the function of performing the dissociation process and the mass analysis in multiple stages (n-stage mass analysis; referred to as "$MS^n$" hereinafter), i.e., the function of selecting, from among dissociated ions, an ion having a particular mass-charge ratio (precursor ion), further dissociating the precursor ion, and performing mass analysis of dissociated ions produced from the precursor ion.

A system in combination of a chromatograph and a mass spectrometer is used for quantitative analysis of a substance being present in very small amount and containing many impurities. In such a system, a substance to be quantitatively analyzed is first separated into components in terms of time by the chromatograph based on, e.g., differences in adsorption of the substance components to a column, and is then separated in terms of mass by the mass spectrometer. In the case of analyzing compounds having combinations of, e.g., isomers of sugar chains or two amino acids having the same mass as one certain amino acid, it is difficult to separate those compounds in terms of mass, but most of the compounds can be separated in terms of time by chromatography based on their chemical and physical properties.

Identification of peptides and proteins is usually carried out by a method using a database search or a method reading an amino acid sequence from the peak intervals of mass spectrum data. Those methods are each executed as post-processing. Therefore, if the amount of information regarding the obtained spectrum is insufficient, the mass spectrum data has to be taken again. Because of a difficulty in repeating the measurement, therefore, those known methods are not useful for analysis of a very small amount of sample, e.g., morbid protein.

JP,A 2000-266737 (Patent Document 1) discloses a method of analyzing a measurement target by comparing the retention time in a sample separating section and the mass spectrum data, which are obtained for the measurement target, with the data of known substances. However, a series of data processing is executed as post-processing.

SUMMARY OF THE INVENTION

In the known mass spectrometry, when measurement of a dissociated ion in the n-th stage ($MS^n$) is performed, an ion species for which $MS^n$ is to be performed is selected from a dissociation mass spectrum obtained in the (n−1)-th stage ($MS^{n-1}$) on the basis of the knowledge of an operator engaged in the measurement. Therefore, the $MS^n$ measurement is troublesome and spectrum analysis is usually carried out until the stage of n=2. With the measurement just up to the stage of n=2, spectrum information necessary for the identification is not obtained at a sufficient level in some cases, and a difficulty arises in identifying an unknown substance. In such a case, supplemental data to compensate for deficiency of information can be obtained by carrying out $MS^n$ ($n \geqq 3$). However, carrying out always the $MS^n$ ($n \geqq 3$) not only reduces throughput of the measurement, but also causes a lowering of identification accuracy due to noise. It is therefore desired to carry out $MS^n$ only when the amount of information effective for identifying a sample is insufficient.

When measurements are performed for the purposes of inspection and diagnosis, just a few substances require to be measured by the operator and other substances are meaningless data, even if measured, in many cases. In the known mass spectrometric systems, however, because mass analysis data is evaluated as post-processing, data not required by the operator is also measured. The presence of a large amount of data, which is not required by the operator, lowers the throughput of analysis executed in post-processing, such as database search.

With the known systems, a particular substance can be measured or excluded from the measurement based on the mass-charge ratio m/z of a measurement target and the retention time τ thereof obtained by liquid chromatography or gas chromatography. However, when the measurement target is protein or peptide, the possible number of amino acid sequences reaches $20^K$ on an assumption that the number of amino acid residues constituting a protein or peptide chain is K and the number of kinds of amino acids is 20. The number of amino acid sequences is further increased if chemical modifications of amino acid side chains are also taken into account. In those amino acid sequences, there are many instances where the total mass of a combination of two amino acids is equal to the mass of one amino acid. Stated another way, those amino acids are difficult to discriminate from each other in terms of mass number in many cases depending on the state of dissociation of the amino acids.

Accordingly, an object of the present invention is to provide a mass spectrometric method, a mass spectrometric system, etc., capable of offering information regarding a measurement target, which is required by an operator, with high efficiency and good accuracy.

To achieve the above object, the present invention provides a mass spectrometric method for use with a tandem mass spectrometer, the method comprising the steps of ionizing a particular substance obtained by separating a sample; performing mass analysis of the ionized substance to obtain a spectrum; comparing the spectrum with a particular spectrum stored in advance and determining whether both the spectra match with each other; and when a match is determined, further ionizing a particular ion within a particular time for detailed analysis. From the viewpoint of determining what kind of detailed analysis is to be performed, it is important that the comparing and determining step and the ionizing step for detailed analysis be executed within a time required for actually obtaining the desired spectrum.

Also, the present invention provides a mass spectrometric system using a tandem mass spectrometer, the system comprising a unit for ionizing a particular substance obtained by separating a sample; a unit for performing mass analysis of the ionized substance to obtain a spectrum; a unit for comparing the spectrum with a particular spectrum stored in advance and determining whether both the spectra match with each other; and a unit for, if a match is determined, further ionizing a particular ion species for detailed analysis.

Further, the present invention provides a mass spectrometric system using a tandem mass spectrometer, wherein selection and separation of an ion species are performed n−1 (n≧1) times, determination is made as to a possibility of match of a mass spectrum measurement result with a spectrum pattern (representing at least one of a mass number m of the ion species, intensity I of the ion species, and a retention time τ in a liquid chromatograph when the liquid chromatograph is installed upstream of the mass spectrometer) designated in advance, the mass spectrum measurement result being represented by a peak of measured intensity with respect to an ion mass-charge ratio m/z, which is obtained as a result of n-th stage mass analysis $MS^n$ performed on the dissociated ion species, and an item of analysis for $MS^n$ in next stage is determined within a particular time based on the determination result.

Still further, the present invention provides a mass spectrometric program for operating a computer to control a mass spectrometric system using a tandem mass spectrometer, wherein the computer functions as a unit for controlling the steps of performing selection and separation of an ion species n−1 (n≧1) times, making determination as to a possibility of match of a mass spectrum measurement result with a spectrum pattern designated in advance, the mass spectrum measurement result being represented by a peak of measured intensity with respect to an ion mass-charge ratio m/z, which is obtained as a result of n-th stage mass analysis ($MS^n$) performed on the dissociated ion species, and determining an item of analysis for $MS^n$ in next stage within a particular time based on the determination result.

According to the present invention, when a substance (particularly such as protein or sugar chains) is analyzed, determination as to whether a measurement target is a substance required by an operator can be made within an actual measurement time and analysis information necessary for the operator can be obtained with high efficiency.

Stated another way, the present invention is intended for a mass spectrometric system using a tandem mass spectrometer in which steps of selecting, dissociating and measuring an ion species to be measured are repeated in multiple stages such that a substance as a measurement target for the mass spectrometer is ionized to produce various ion species, and one of the produced various ion species having a particular mass-charge ratio m/z is selected and dissociated, followed by measurement of the dissociated ion species.

In the present invention, the measured mass spectrum is compared with patterns stored in a database, which is prepared in the mass spectrometer, to determine a match of the measured mass spectrum with any stored pattern, and an item of next analysis is decided depending on the determination result. Therefore, the measurement required by the operator can be performed with high efficiency. According to the present invention, in a mass spectrometric system comprising a sample introducing unit, a sample separating unit, a sample ionizing unit, and a mass analyzing unit, spectrum patterns representing the retention time τ measured in the sample separating unit and the $MS^n$ (n≧1) data obtained from the mass analyzing unit can be evaluated within an actual measurement time (within 10 ms), and only the measurement required by the operator can be performed.

Several preferred forms of the present invention will be described below.

In one form of the present invention, a mass spectrometric system using a tandem mass spectrometer repeatedly executes steps of selecting, dissociating and measuring an ion species to be measured in multiple stages such that a substance as a measurement target for the mass spectrometer is ionized to produce various ion species, and one of the produced various ion species having a particular mass-charge ratio m/z is selected and dissociated, followed by measurement of the dissociated ion species.

According to the present invention, in a mass spectrometric system comprising a sample introducing unit, a sample separating unit, a sample ionizing unit, and a mass analyzing unit, the most important feature resides in evaluating measured spectrum patterns, particularly spectrum patterns representing the retention time τ measured in the sample separating unit and the $MS^n$ (n≧1) data obtained from the mass analyzing unit, and then determining the item of next analysis based on the evaluation result.

The above-mentioned particular spectrum represents at least one of a mass number m of an ion in a particular substance, a retention time τ in a separating step, a mass-charge ration m/z, and intensity of a dissociated ion.

The above-mentioned particular time is a period from a point in time at which one mass spectrum is obtained to a point in time at which a next mass spectrum is obtained. Usually, the particular time is not longer than 10 ms.

The above-mentioned spectrum pattern designated in advance for the ion species represents one or more of an ion retention time τ in the sample separating unit including a liquid chromatograph or a gas chromatograph, an ion mass number m, an ion mass-charge ratio m/z, and ion intensity information, which are stored in a database prepared in the mass spectrometric system. In particular, it is optimum to use three of them, i.e., the retention time, the mass number, and the intensity information.

When the determination shows a possibility of match of the $MS^n$ spectrum obtained as the result of mass analysis in the n-th (n≧1) stage with the spectrum pattern designated in advance, the mass spectrometric system may perform $MS^{n+1}$ on a particular ion or may proceed to a subsequent process without performing the $MS^{n+1}$. The above-mentioned particular ion for which the $MS^{n+1}$ is performed is an ion that is stored in an internal database and designated in advance. The ion intensity information used in the spectrum pattern determination is preferably absolute intensity information or relative intensity information of an ion.

When the determination shows no possibility of match of the $MS^n$ spectrum obtained as the result of mass analysis in the n-th (n≧1) stage with the spectrum pattern designated in advance, the mass spectrometric system may perform $MS^{n+1}$ on a particular ion or may proceed to a subsequent process without performing the $MS^{n+1}$. The above-mentioned particular ion for which the $MS^{n+1}$ is performed is an ion having intensity not lower than a threshold designated by the operator, or an ion that is regarded as being modified by a modification group, or an ion having maximum intensity in the $MS^n$ spectrum.

As another form of the present invention, a diagnosis system using the above-described mass spectrometric system is provided. The diagnosis system includes one or more internal databases in which information of ion species designated in advance and spectrum patterns obtained from the ion species are stored, so that the internal databases can be used as required.

Determination as to a match of spectrum pattern can be made using, as the above-mentioned inner databases, both or one of a database storing information of spectra obtained from samples extracted from healthy persons and a database storing information of spectra obtained from samples extracted from diseased persons. In the diagnosis system, a diagnosis or inspection result can be outputted after evaluating the result.

As still another form of the present invention, an inspection system using the above-described mass spectrometric system is provided. The inspection system includes or employs one or more internal databases in which information of ion species designated in advance and spectrum patterns obtained from the ion species are stored, so that the internal databases can be used as required.

Determination as to a match of spectrum pattern can be made using, as the inner databases, both or one of a database storing information of spectra obtained from reference samples and a database storing information of spectra obtained from particular samples designated by an operator. A diagnosis or inspection result can be outputted after evaluating the result.

As still another form of the present invention, a mass spectrometric system using a tandem mass spectrometer is provided in which parent ions for $MS^n$ selected based on a spectrum of $MS^{n-1}$ ($n \geqq 2$) are subjected to a series of $MS^n$, intensity of each parent ion having the same mass-charge ratio m/z is integrated during the series of $MS^n$ within a time designated in advance by an operator, and when the integrated value exceeds a particular value, the ion having the relevant mass-charge ratio m/z is excluded from the parent ions for subsequent one or more $MS^n$.

When the absolute intensity information is used in the spectrum pattern determination, the ion intensity information stored in an internal database in advance is corrected based on intensity of a reference sample within an actual measurement time.

DESCRIPTION OF THE PREFERRED EMBODIMENTS

Embodiments of the present invention will be described below with reference to the drawings.

First Embodiment

Figure 1:
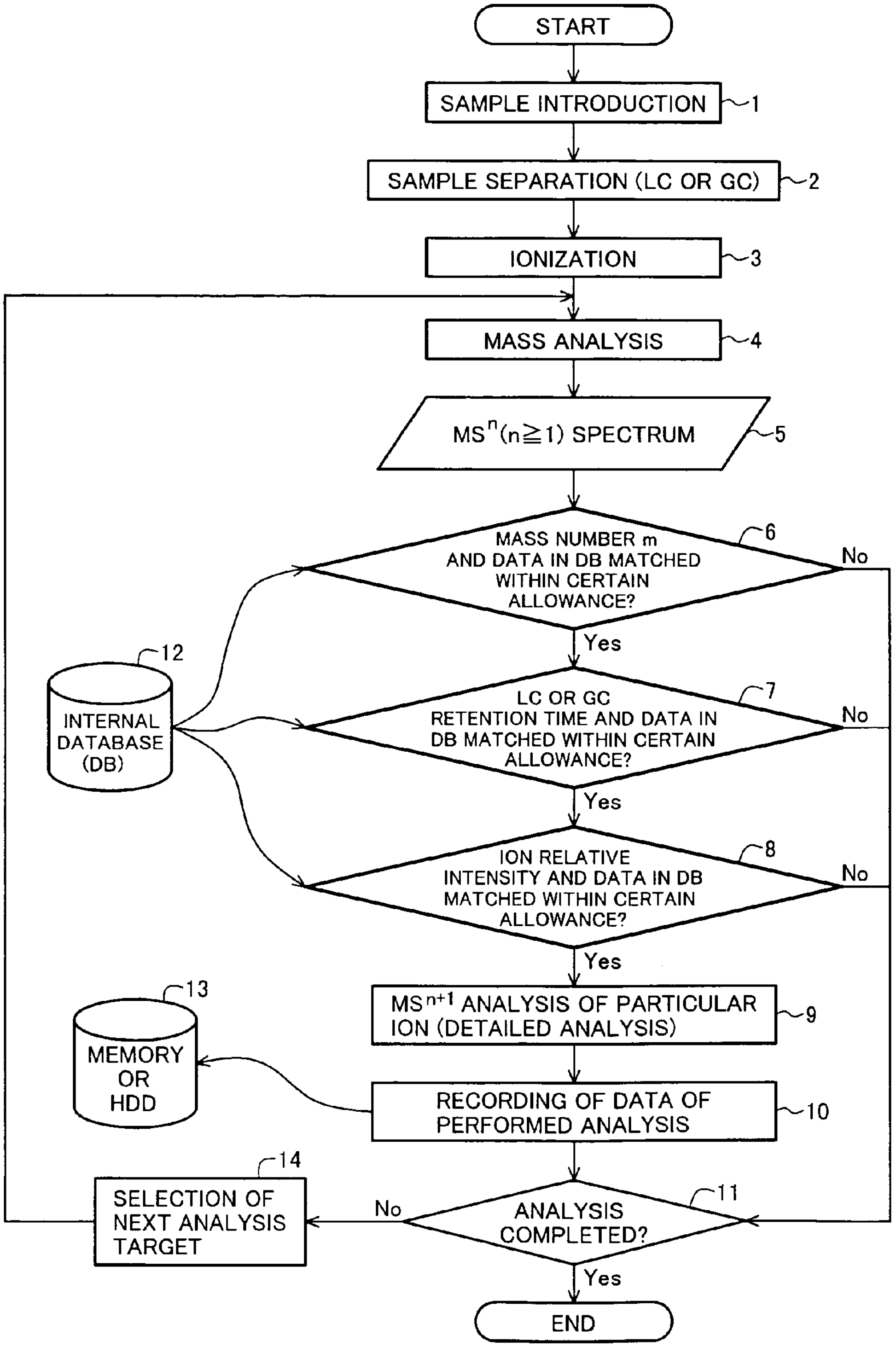
FIG. 1 is a flowchart of an automatic determination process in a mass spectrometric flow according to a first embodiment of the present invention.

FIG. 1 is a flowchart of an automatic determination process for analyzed results in a mass spectrometric system according to a first embodiment of the present invention. Mass analysis data is measured using a mass spectrometric system 23 shown in FIG. 2. In the mass spectrometric system 23, a sample as an analysis target is preprocessed by a pre-processing system 15, e.g., a liquid chromatograph. When an original sample is protein, for example, the protein is decomposed by a digestive enzyme into the size of peptide and then separated into components in the pre-processing system 15 using a gas chromatograph (GC) or a liquid chromatograph (LC). Then, the particular component is ionized in an ionizing section 16, and produced ions are separated from each other by a mass analysis section 17 depending on the mass-charge ratio m/z of each ion.

Here, m represents the mass of an ion, and z represents the electrical charge valence of the ion. The separated ion is detected by an ion detecting section 18, and sorting and processing of the detected data are performed by a data processing section 19. The mass analysis data obtained as the analysis result is displayed in a display section 20. An overall control section 21 controls the whole of a series of above-mentioned mass spectrometric processes, i.e., the pre-processing of the sample, the ionization of the sample, transport and introduction of a sample ion beam to the mass analysis section 17, the mass separation process, the ion detection, and the data processing. Information necessary for an operator is inputted from an operator input section 22. The overall control section 21 incorporates a computer for performing predetermined functions in accordance with programs.

Mass spectrometry is divided into a method of performing mass analysis just after ionizing a sample (MS method), and a tandem mass spectrometric method of selecting a particular sample ion (parent ion) in terms of mass, and then performing mass analysis of dissociated ions produced by dissociating the selected sample ion. The tandem mass spectrometric method has the ($MS^n$) function of performing the dissociation process and the mass analysis in multiple stages, i.e., the function of selecting, from among dissociated ions, an ion having a particular mass-charge ratio (precursor ion), further dissociating the precursor ion, and performing mass analysis of dissociated ions produced from the precursor ion. More specifically, the dissociation process and the mass analysis are performed in multiple stages as follows. A mass spectrometric distribution of a substance in an original sample is first measured as mass spectrum data ($MS^1$). Then, a parent ion having a certain m/z ratio is selected and dissociated to measure mass spectrum data ($MS^2$) of dissociated ions. From the $MS^2$ mass spectrum data, a precursor ion is further selected and dissociated, followed by measuring mass spectrum data ($MS^3$) of thus-dissociated ions. For each of dissociation stages, information regarding the molecular structure of the precursor ion in the state before the dissociation is obtained, and this information is very effective in estimating the molecular structure of the precursor ion. As the structure information of the precursor ions in respective stages is obtained in even more detail, accuracy in estimating the structure of the parent ion, i.e., the molecular structure of the original ion, is increased correspondingly.

Figure 2:
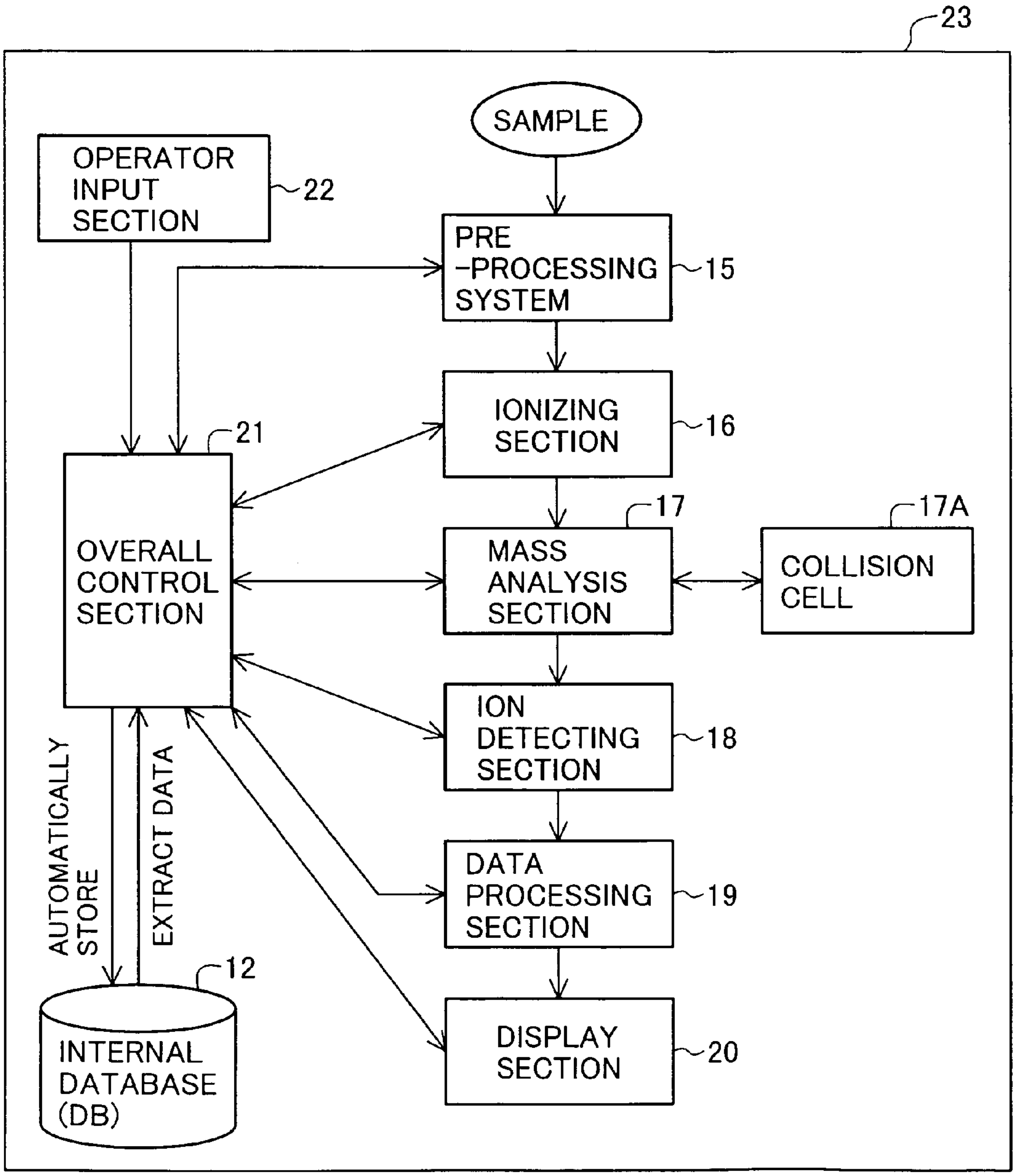
FIG. 2 is a block diagram of an overall mass spectrometric system for measuring mass analysis data according to the first embodiment of the present invention.

This embodiment is described in connection with the case of using, as a manner of dissociating the parent ion, a collision induced dissociation method in which the parent ion is dissociated upon collision with buffer gas, such as helium gas. In other words, natural gas, such as helium gas, is required to perform the collision induced dissociation. As shown in FIG. 2, therefore, a collision cell 17A for the collision induced dissociation is provided separately from the mass analysis section 17. Alternatively, the neutral gas may be filled in the mass analysis section 17 so as to perform the collision induced dissociation inside the mass analysis section 17. In such a case, the collision cell 17A can be dispensed with. Further, the parent ion may be dissociated by an electron capture dissociation method of irradiating electrons at low energy and causing a parent (target) ion to capture many low-energy electrons so that the target ion is dissociated.

Figure 3:
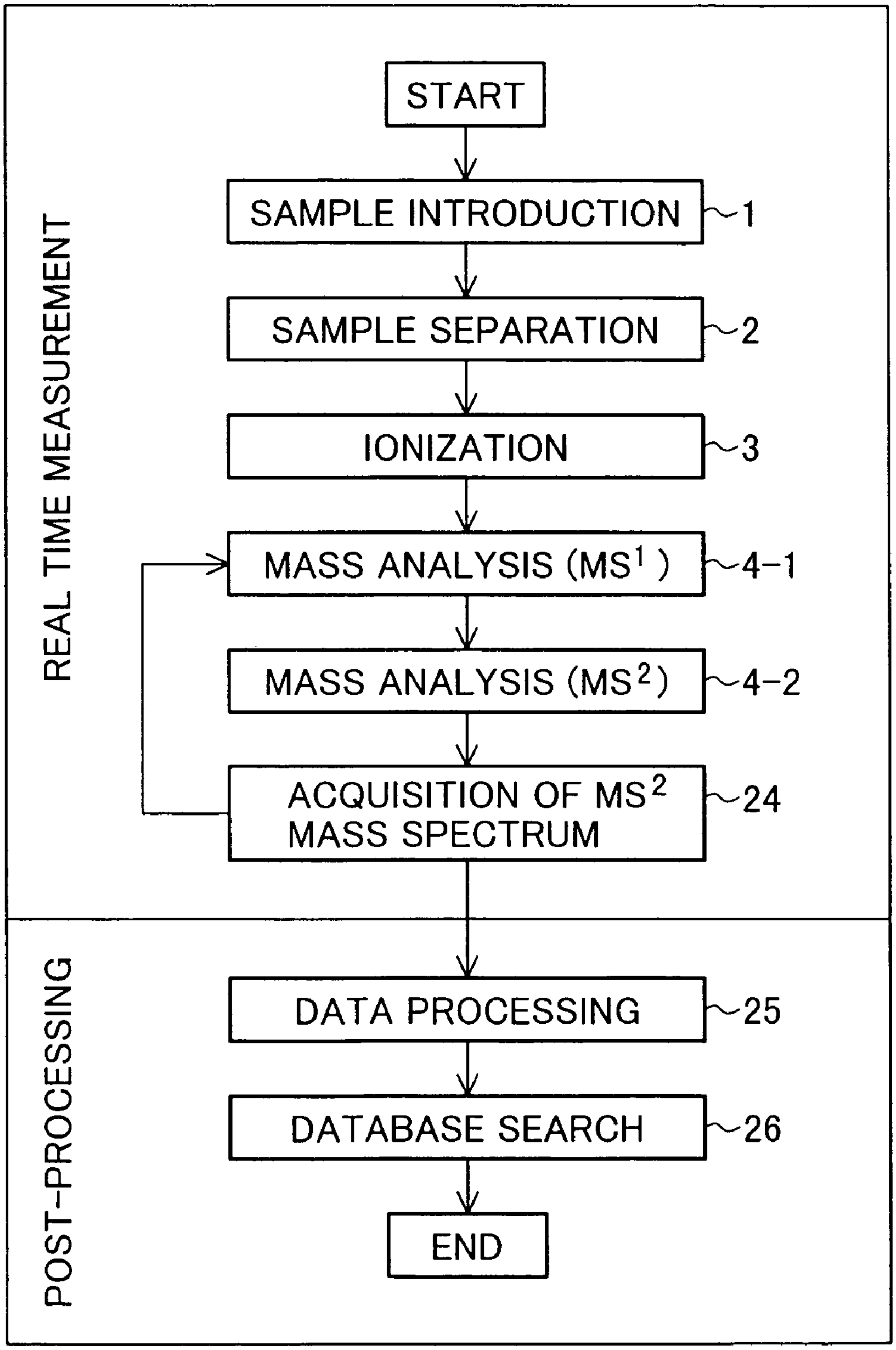
FIG. 3 is a flowchart of a mass spectrometric flow in the related art.

FIG. 3 shows a flow for identifying protein in the related art using the tandem mass spectrometric method. In FIG. 3, the same reference numerals as those in FIG. 1 denote the same components in FIG. 1. Those same components will be described later with reference to FIG. 1, and the following description is made primarily of points differing from FIG. 1. An introduced sample is separated by LC or GC and then ionized. Subsequently, mass analysis ($MS^1$) 4-1 is performed on the ionized sample, and a precursor ion for which $MS^2$ is to be performed is selected from among detected ions. After dissociating the selected precursor ion, mass analysis ($MS^2$) 4-2 is performed to obtain $MS^2$ mass spectrum data in step 24. The obtained mass spectrum data is subjected to data processing 25, such as removal of noise peaks and isotope peaks and valence determination of ions, which are executed as post-processing after the end of the measurement. Then, database search 26 is performed using protein database made up of the known protein data. With the identification flow described above, since the obtained $MS^2$ mass spectrum data is examined as the post-processing, it is impossible to determine effectiveness of the $MS^2$ mass spectrum data in real time. Meanwhile, when the sample amount is very small, it is important to obtain the information required by the operator by one measurement because of a difficulty in performing the analysis again.

To overcome such a problem, in the present invention, whether a substance is one required by the operator and registered in an internal database beforehand is determined within an actual measurement time by using the LC retention time of peptide produced upon protein decomposition with an enzyme, the mass number, and the spectrum intensity information (pattern), and an analysis flow is automatically decided based on the determination result.

Here, the term "retention time" represents the time from a point in time at which the introduced sample is trapped in LC to a point in time at which the trapped sample is eluted and detected by a detector. The peptide introduced to the LC develops an interaction with the solid phase of an LC column depending on its chemical properties. The degree of the interaction differs depending on the kind of peptide, and hence the retention time differs depending on the molecular structure of the substance.

A mass spectrometric flow according to the first embodiment of the present invention will be described below with reference to FIGS. 1 and 2. In FIG. 1, steps indicated by thick lines represent the processing executed by the data processing section 19. A sample is introduced in a step of sample introduction 1. A step of sample separation 2 is executed in the pre-processing system 15 by using LC or GC. In this embodiment, LC is used for the pre-processing.

Then, the separated sample is ionized (step 3) in the ionizing section 16. In this embodiment, the ESI (Electro Spray Ionization) method is used for ionizing the sample. Subsequently, the ionized sample is subjected to mass analysis 4. In the mass analysis 4, the mass analysis section 17, the ion detecting section 18, and the data processing section 19 execute the processing necessary for the mass analysis. The LC used in the sample separation 2 is synchronized with the mass analysis section 17, the ion detecting section 18 and the data processing section 19, and the time at which the mass analysis is executed is obtained as the retention time $\tau$ of the substance under the measurement.

Then, for $MS^n$ ($n \geqq 1$) mass spectrum data 5 obtained with the mass analysis 4, the data processing section 19 executes a step of determination 6 as to whether the measured mass number m matches with any data previously stored in the internal database within a certain allowance. If there is a match, the data processing section 19 executes a step of determination 7 as to whether the measured LC or GC retention time matches with any data previously stored in the internal database within a certain allowance. If there is a match, the data processing section 19 executes a step of determination 8 as to whether the relative intensity of the dissociated ion, i.e., the spectrum pattern, matches with any pattern previously stored in the internal database within a certain allowance. If there is no match with the data in the internal database in all the steps 6-8, $MS^{n+1}$ is not performed and the data processing section 19 skips to a step of determination 11 as to whether the analysis is to be completed.

If the measured data (spectrum) matches with the data previously stored in the internal database in all the steps 6-8, $MS^{n+1}$ 9 is performed on a particular ion designated by the operator. In the case of peptide modified by a phosphoric acid, for example, the $MS^{n+1}$ can be performed on an ion that is assumed to have a phosphate group affixed to it, and therefore more detail information can be obtained. The data of the analysis having been performed are recorded in a memory or a hard disk drive (HDD) 13. Then, the step of determination 11 as to whether the analysis is to be completed is executed, and if the analysis is not to be completed, the processing of steps 4-11 and 14 (selection of a next analysis target) is repeated until the determination to complete the analysis is made. The total processing time of the steps 6-8 executed by the data processing section 19 is within 10 ms and provides no influences on the measurement.

Figure 4:
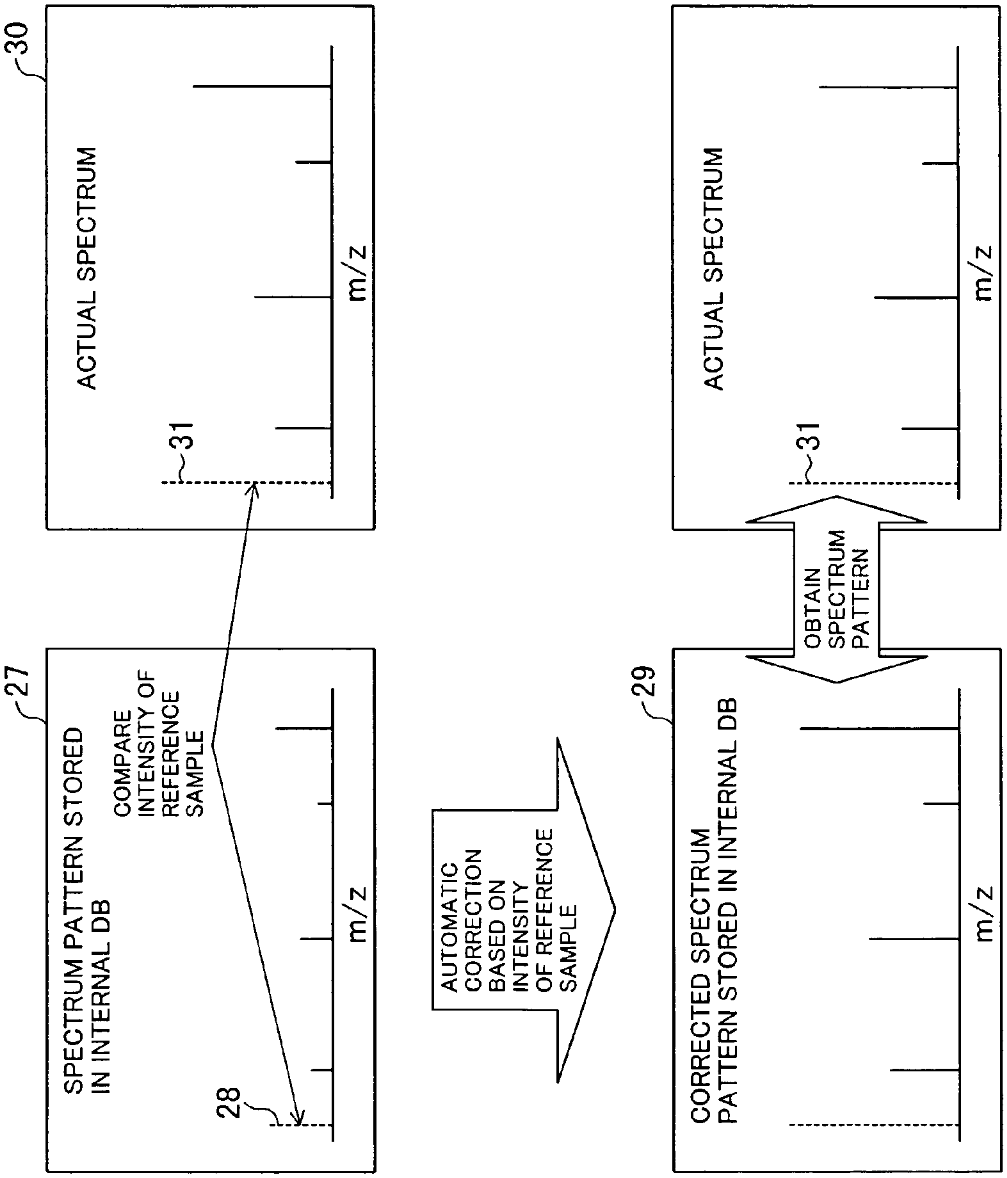
FIG. 4 is a conceptual view for explaining automatic correction of intensity based on the intensity of a reference sample for an $MS^n$ spectrum according to the first embodiment of the present invention.

While this embodiment employs the relative intensity as intensity information for use in the pattern determination, absolute intensity may be used instead for the pattern determination. In such a case, as shown in FIG. 4, a reference substance (sample) of certain concentration is added to the sample, and the spectrum intensity stored in the internal database (DB) is automatically corrected based on the intensity of the reference substance. The determination is then made using the automatically corrected value. In FIG. 4, numeral 27 denotes a spectrum pattern stored in the internal DB, and 28 denotes the intensity of the reference substance. Numeral 29 denotes a spectrum pattern automatically corrected based on the intensity of the reference substance and stored in the internal DB. Numeral 30 denotes an actually measured spectrum pattern, and 31 denotes the intensity of the reference substance in the actually measured spectrum.

Figure 5:
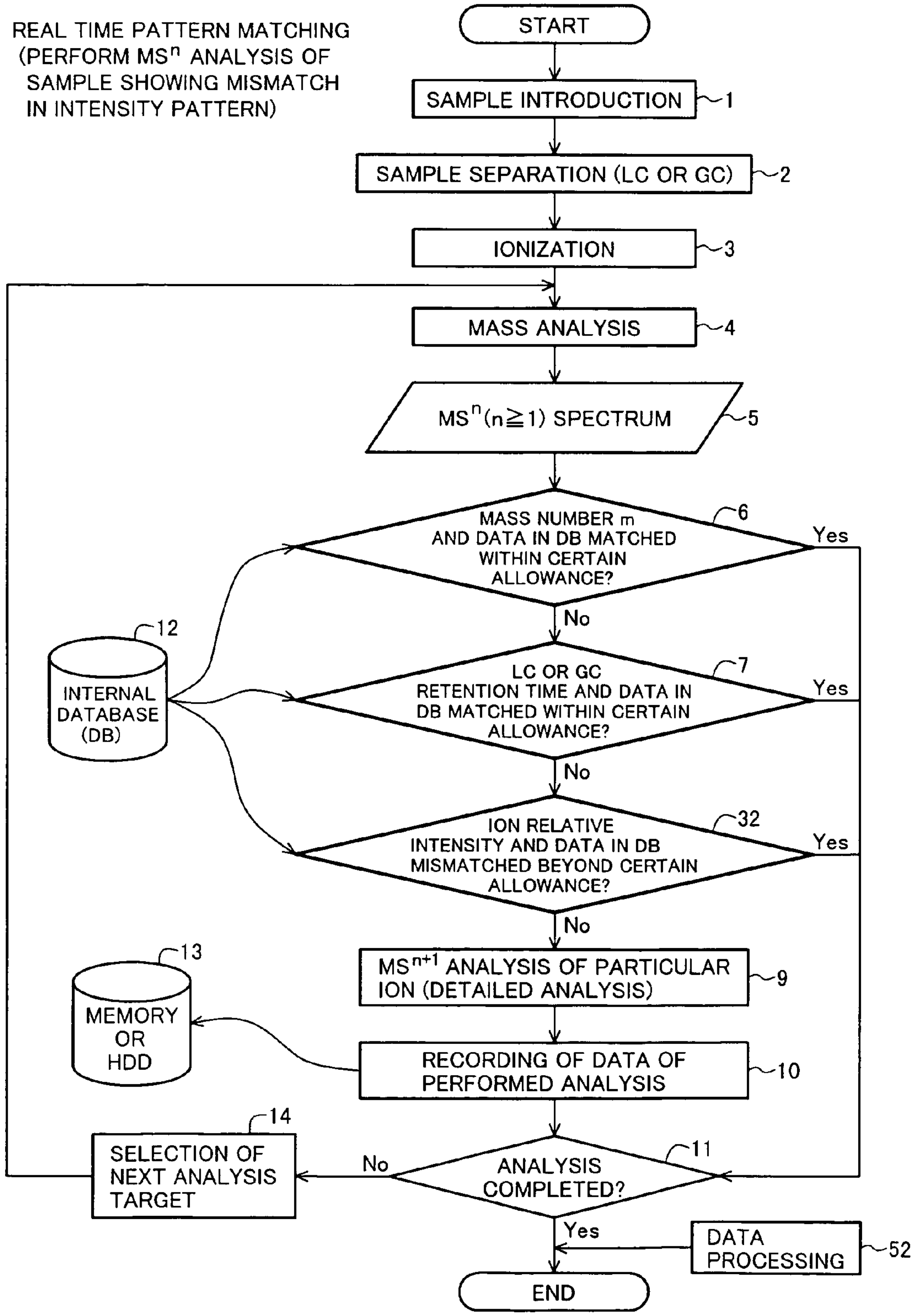
FIG. 5 is a flowchart of an automatic determination process that is used to execute detailed analysis when there is a spectrum pattern mismatch in the mass spectrometric flow, shown in FIG. 1, according to the first embodiment of the present invention.

While the $MS^{n+1}$ is performed in FIG. 1 on the substance which has showed a match in both the retention time and the spectrum pattern, the $MS^{n+1}$ may be performed on the substance which has showed a mismatch in the spectrum pattern, as shown in FIG. 5. In FIG. 5, numeral 32 denotes a step of determination as to whether the relative intensity of the ion mismatches from any patterns in the internal DB beyond a certain allowance. A substance showing a mismatch in spectrum pattern is an unknown substance, and there is a high possibility that such a substance is one subjected to posttranslational modification, for example. Further, the operator can freely set which one(s) of the match determinations regarding the mass number m, the retention time τ, and the spectrum pattern is used to perform the $MS^{n+1}$. Similar evaluation can also be made on sugar chains, chemically modified proteins, chemically modified polypeptides, chemically modified sugar chains, metabolites for metabolome, etc. The modification shown in FIG. 5 is a system intended to carry out qualitative and quantitative analyses of unknown substances, and after the completion of the mass spectrometric flow, the obtained data is subjected to data processing 52 for the intended analysis.

Second Embodiment

Figure 6:
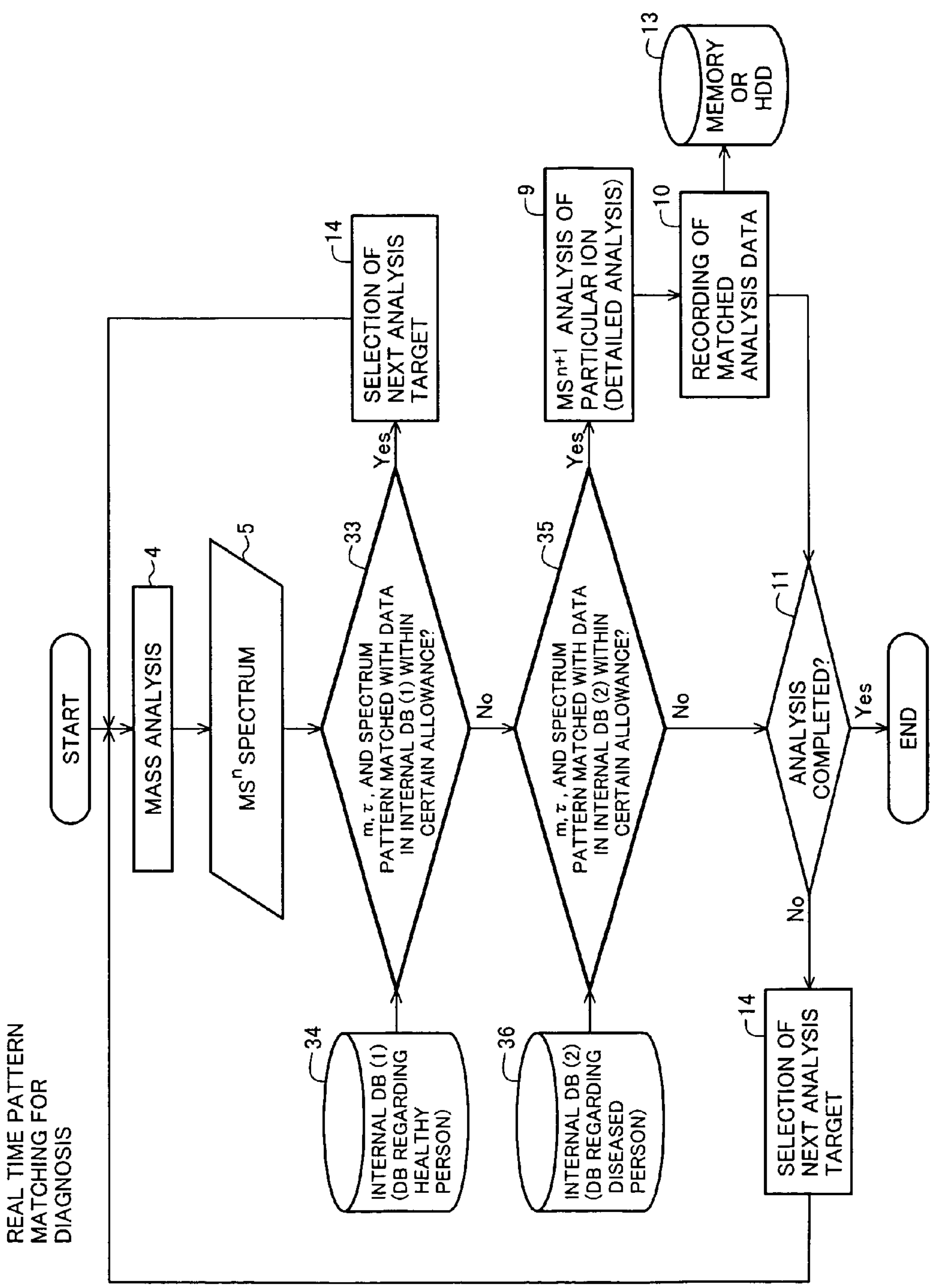
FIG. 6 is a flowchart of a mass spectrometric flow for diagnosis according to a second embodiment of the present invention.

A second embodiment of the present invention will be described below. In order to efficiently carry out diagnosis and inspection, it is desired to determine a substance required by the operator (i.e., a substance to be diagnosed and inspected) and to perform detailed measurement just on that substance within an actual measurement time. FIG. 6 shows a processing flow for diagnosis performed based on the presence or absence of particular protein. In this second embodiment, a step of determination 33 is executed as to whether, for the measured $MS^n$ spectrum 5, the mass number m, the LC or GC retention time τ, and the intensity pattern of the dissociated ion match with internal database (1) 34, which is made up of the data regarding a healthy person, within a certain allowance. If there is a match, the processing flow advances to a step of selection 14 of a next analysis target.

On the other hand, if there is no match with the database regarding a healthy person, a step of determination 35 is executed as to whether the mass number m, the LC or GC retention time τ, and the intensity pattern of the dissociated ion match with internal database (2) 36, which is made up of the data regarding a particular diseased person, within a certain allowance. If there is no match, the processing flow advances to a step of determination 11 as to whether the analysis is to be completed.

Additionally, if there is a match, this means the presence of a possibility that a subject under diagnosis suffers from a particular disease. Therefore, $MS^{n+1}$ 9 is automatically performed on a previously designated particular ion to obtain detailed information. At this time, the analysis data of the sample showing a match is recorded (step 10) in a memory or a hard disk drive 13. Then, the step of determination 11 as to whether the analysis is to be completed is executed, and it the analysis is not to be completed, the above-described processing is repeated until the determination to complete the analysis is made. With this embodiment, the detailed analysis can be performed just on the substance that is assumed to be registered in the database regarding the particular diseased person, thus resulting in improvements of throughput and accuracy of the diagnosis. While this embodiment employs two kinds of internal databases for making two steps of determinations, three or more internal databases may be used instead.

Figure 7:
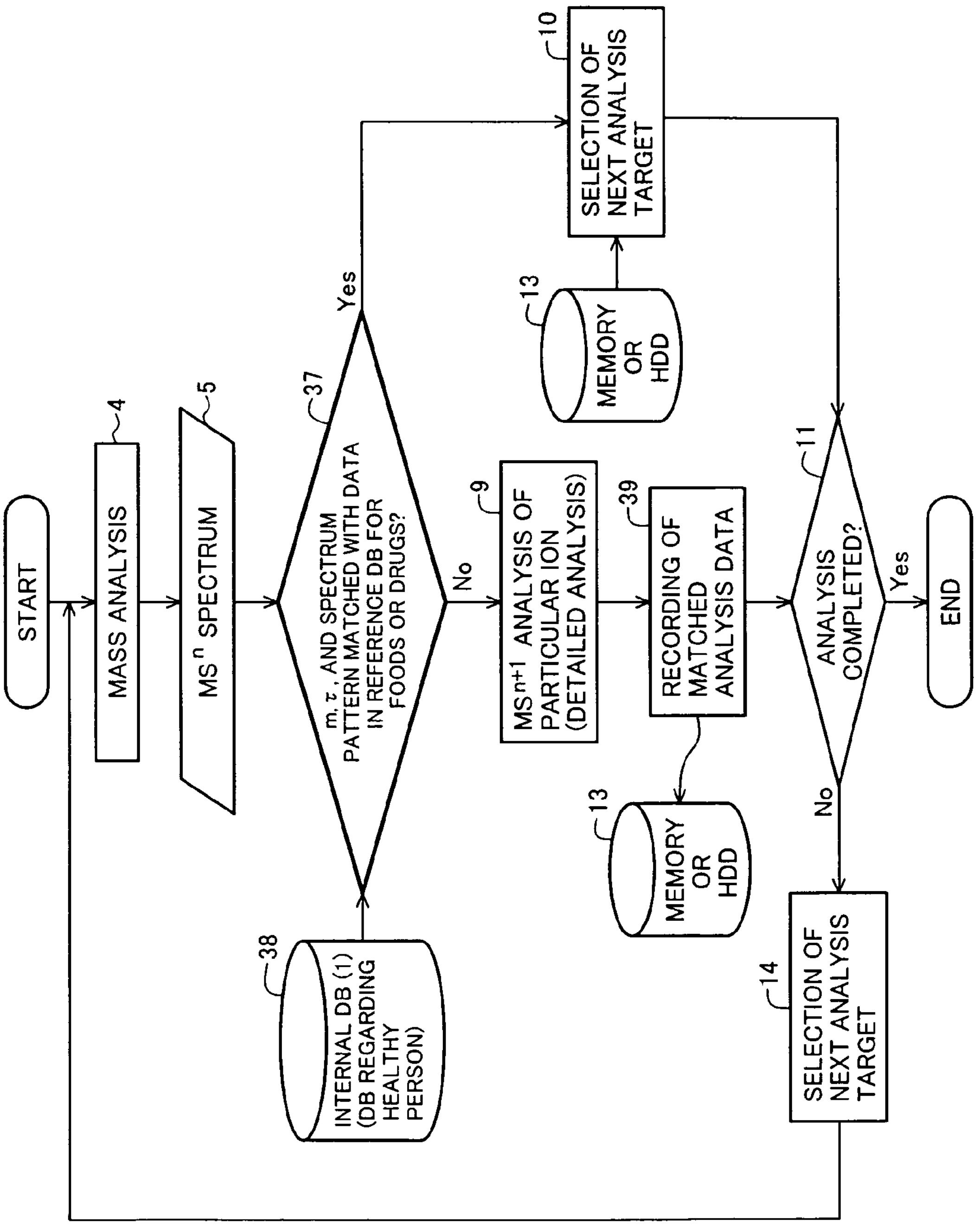
FIG. 7 is a flowchart of a mass spectrometric flow for inspection of foods or drugs according to the second embodiment of the present invention.

FIG. 7 shows a processing flow for inspection of foods or drugs. In this processing flow, a step of determination 37 is executed as to whether, for the measured $MS^n$ spectrum 5, the mass number m, the LC or GC retention time τ in LC or GC, and the intensity pattern of the dissociated ion match with internal database 38, which is made up of the data regarding a reference substance designated by the operator. If there is a match, the analysis data is recorded (step 10), as matched data, in the memory or the hard disk drive 13.

If there is no match, $MS^{n+1}$ 9 is performed on a particular ion having an intensity maximum peak, for example, which is designated by the operator. The analysis data is recorded (step 39), as mismatched data, in the memory or the hard disk drive 13. Then, the step of determination 11 as to whether the analysis is to be completed is executed. If the analysis is not to be completed, a next analysis target is selected in step 14, and the above-described processing is repeated until the determination to complete the analysis is made. Thus, since the measured data is compared in the measurement with the internal database which is made up of the data regarding the reference substance, efficient inspection of an unknown substance contained in the sample can be realized. Also, a plurality of internal databases may be used instead to make the determination for inspection.

Third Embodiment

Figure 8:
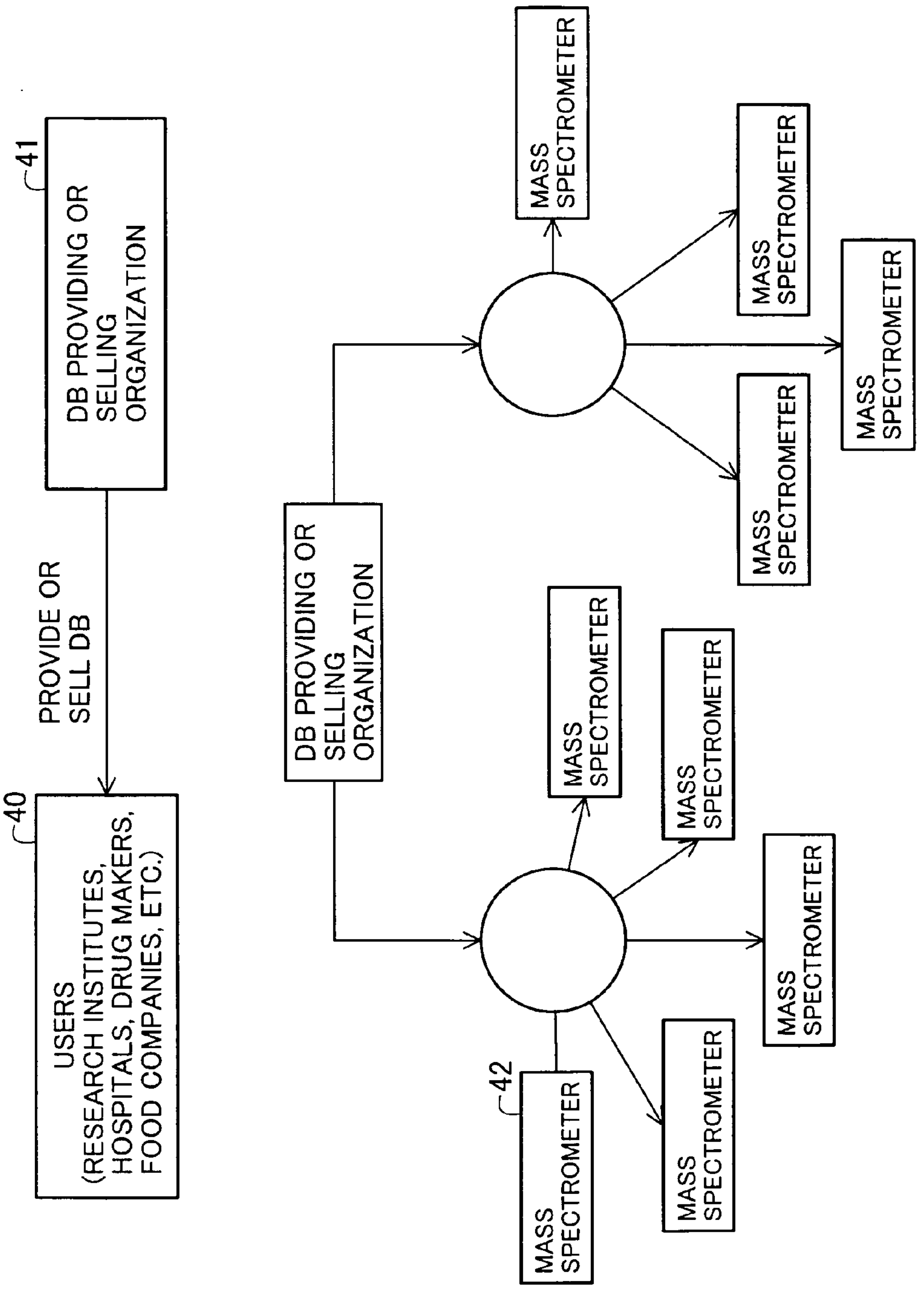
FIG. 8 is a block diagram for explaining a manner of providing or updating internal database according to a third embodiment of the present invention.

A third embodiment of the present invention will be described below. FIG. 8 illustrates a manner of providing or updating the internal database. The internal database used for making the determination in the measurement is routinely supplied or sold from a database (DB) providing or selling organization 41 to users 40, such as research institutes, hospitals, drug makers, and food companies. As one example for providing the database, the database is transmitted in a lump from the DB providing or selling organization 41 via a network, e.g., the Internet, and mass spectrometers 42 owned by the users are automatically and routinely updated. With the routine update of the database, each user can always perform analysis using the latest information. Also, if some user demands a particular database, it is possible to provide the demanded database to only the relevant user. Alternatively, the database may be originally prepared by the individual users.

Fourth Embodiment

Figure 9:
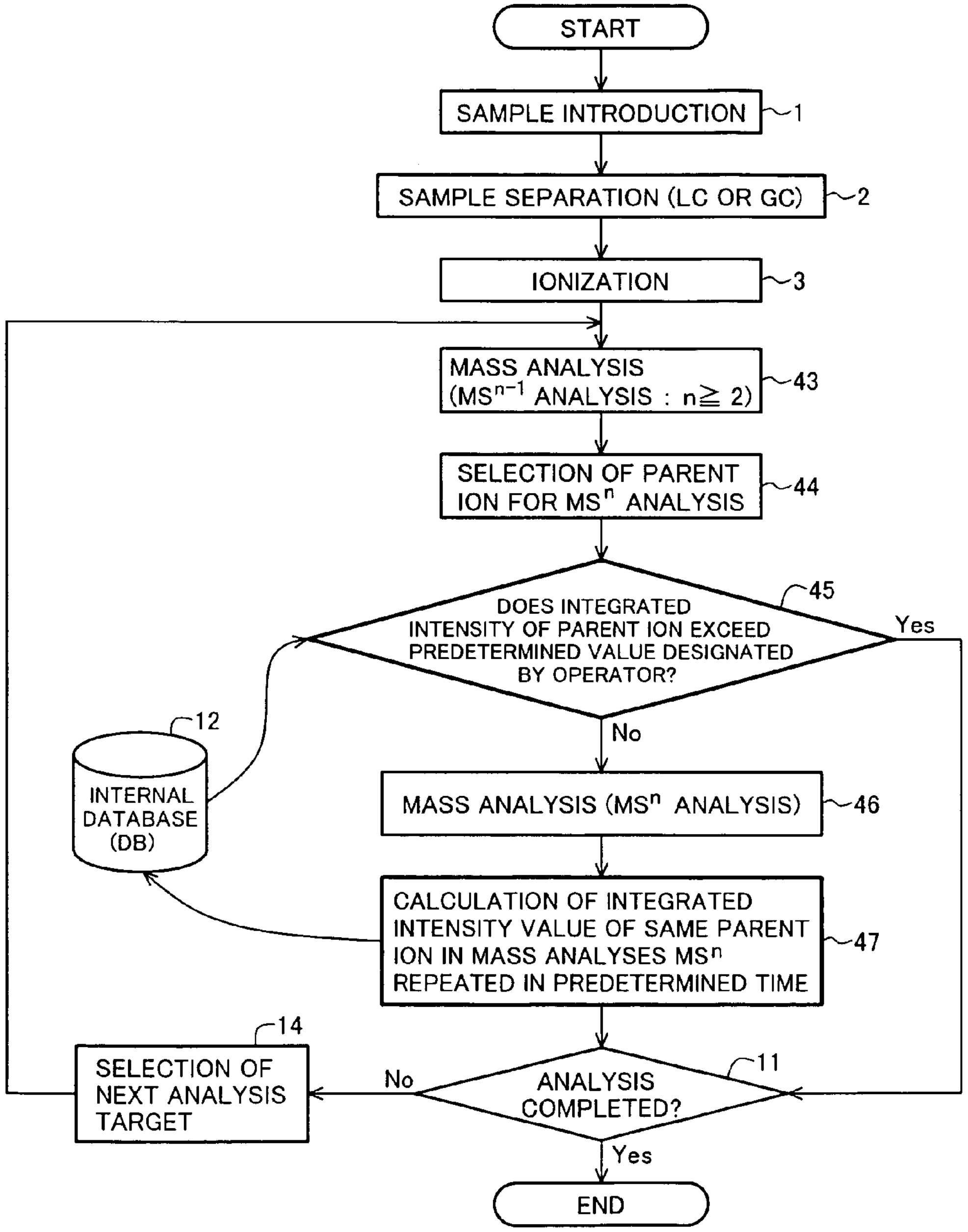
FIG. 9 is a flowchart of an automatic determination process in a mass spectrometric flow according to a fourth embodiment of the present invention when a next analysis target is determined from an integrated value of the intensity of a parent ion for $MS^n$.

A fourth embodiment of the present invention will be described below. FIG. 9 shows a mass spectrometric flow when a next analysis target is determined from an integrated value of the intensity of a parent ion for $MS^n$. A sample is introduced in a step of sample introduction 1. A step of sample separation 2 is executed in the pre-processing system 15 by using LC or GC. In this embodiment, LC is used for the pre-processing. Then, the separated sample is ionized (step 3) in the ionizing section 16. In this embodiment, the ESI (Electro Spray Ionization) method is used for ionizing the sample. Subsequently, the ionized sample is subjected to mass analysis ($MS^{n-1}$: $n \geqq 2$) 43. From $MS^{n-1}$ mass spectrum data obtained with the mass analysis, a parent ion for next $MS^n$ is selected in step 44. It is then determined in step 45 whether the integrated intensity of the selected parent ion exceeds a predetermined value designated by the operator.

In an ordinary mass spectrometric system, $MS^n$ 46 is often performed in plural times for the same ion species. However, throughput is reduced by repeating the same analysis beyond the necessary number of times for the ion species for which information has already been obtained in amount sufficient to identify protein. To avoid such a problem, an integrated value of the intensity of the same parent ion is calculated in step 47, and if the integrated value exceeds the predetermined value, the relevant ion is excluded from the candidates of the parent ion for the $MS^n$.

Figure 10:
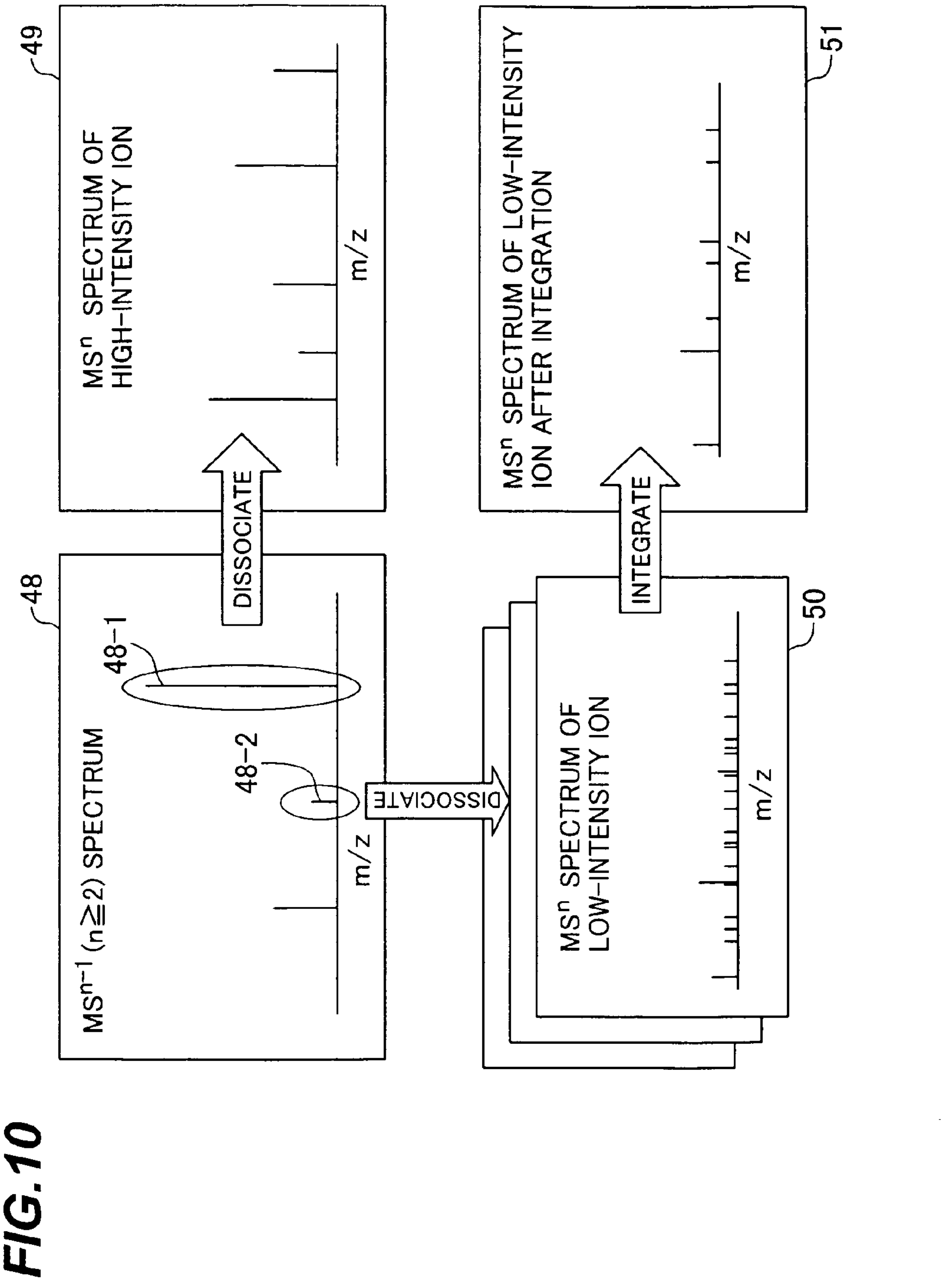
FIG. 10 shows a spectrum obtained by the $MS^n$ of a high-intensity ion and a spectrum obtained by integration of measured values for a low-intensity ion, the ions being both obtained with $MS^{n-1}$, according to the fourth embodiment of the present invention.

Generally, as shown in FIG. 10, when an ion having high intensity is selected and dissociated as indicated by 48-1, an $MS^n$ spectrum 49 with a high s/N ratio is obtained in many cases. On the other hand, when an ion having low intensity is selected and dissociated as indicated by 48-2, an $MS^n$ spectrum 50 with a low S/N ratio is obtained in many cases. In the latter case, therefore, several spectra are integrated to improve spectrum quality as represented by 51. This integration process makes it possible to avoid the high-intensity ion from being uselessly measured in plural times, and to improve quality of the mass analysis spectrum obtained from a very small amount of ion.

The integrated intensity value calculated in step 47 is stored in the internal database 12 and is used in selecting a parent ion for the next $MS^n$. Then, a step of determination 11 as to whether the analysis is to be completed is executed. If the analysis is not to be completed, a next analysis target is selected in step 14, and the above-described processing is repeated until the determination to complete the analysis is made. Thus, for a high-intensity ion, the measurement can be avoided from being performed redundantly beyond the necessary number of times. For a very small amount of sample, a mass spectrum having higher quality (higher S/N ratio) can be obtained and identification accuracy can be increased in comparison with the related art.

What is claimed is:

1. A mass spectrometric method for use with a tandem mass spectrometer, the method comprising the steps of:

ionizing a particular substance obtained by separating a sample;

performing mass analysis of the ionized substance to obtain a spectrum;

comparing said spectrum with a particular spectrum stored in advance and determining whether both the spectra match with each other or not by using a spectrum pattern matching judgment; and when a match is determined, further ionizing a particular ion within a particular time for detailed analysis, parent ions for $MS^n$ being selected based on a spectrum of $MS^{n-1}$ ($n \geqq 2$) and being subjected to a series of $MS^n$, an intensity of each parent ion having the same mass-charge ratio m/z being integrated during the series of $MS^n$ within a time designated in advance by the operator, and when the integrated value exceeds a particular value, the ion having the relevant mass-charge ratio m/z being excluded from the parent ions for a subsequent one or more $MS^n$.

2. The mass spectrometric method according to claim 1, wherein when the absolute intensity information is used in the spectrum pattern determination, the ion intensity information stored in a internal database in advance is corrected based on intensity of a reference sample within an actual measurement time.

3. The mass spectrometric method according to claim 1, wherein said particular ion for which $MS^{n+1}$ is performed is an ion having intensity not lower than a threshold designated by the operator, or an ion that is regarded as being modified by a modification group, or an ion having maximum intensity in the $MS^n$ spectrum.

4. A diagnosis method using the mass spectrometric method according to claim 1.

5. A diagnosis method using the mass spectrometric method according to claim 1, wherein said diagnosis method includes performing said comparing step with one or more internal databases in which information of ion species designated in advance and spectrum patterns obtained from the ion species are stored.

6. The diagnosis method according to claim 5, wherein said determination as to whether both spectra match uses, as said internal databases, both or one of a database storing information of spectra obtained from samples extracted from healthy persons and a database storing information of spectra obtained from samples extracted from diseased persons.

7. An inspection method using the mass spectrometric method according to claim 1.

8. The inspection method according to claim 7, wherein said inspection method employs one or more internal databases in which information of ion species designated in advance and spectrum patterns obtained from the ion species are stored.

9. The inspection method according to claim 7, wherein said determination as to whether both spectra match uses, as said internal databases, both or one of a database storing information of spectra obtained from reference samples and a database storing information of spectra obtained from particular samples designated by an operator.

10. A mass spectrometric system using a tandem mass spectrometer, the system comprising:

means for ionizing a particular substance obtained by separating a sample;

means for performing mass analysis of the ionized substance to obtain a spectrum;

means for comparing said spectrum with a particular spectrum stored in advance and determining whether both the spectra match with each other or not by using a spectrum matching judgment; and means for, if a match is determined, further ionizing a particular ion species for detailed analysis, parent ions for $MS^n$ being selected based on a spectrum of $MS^{n-1}$ ($n \geqq 2$) and being subjected to a series of $MS^n$, an intensity of each parent ion having the same mass-charge ratio m/z being integrated during the series of $MS^n$ within a time designated in advance by an operator, and when the integrated value exceeds a particular value, the ion having the relevant mass-charge ratio m/z being excluded from the parent ions for subsequent one or more $MS^n$.

11. The mass spectrometric system according to claim 10, wherein when the absolute intensity information is used in the spectrum pattern determination, the ion intensity information stored in an internal database in advance is corrected based on intensity of a reference sample within an actual measurement time.

12. The mass spectrometric system according to claim 10, wherein said particular ion for which $MS^{n+1}$ is performed is an ion having intensity not lower than a threshold designated by the operator, or an ion that is regarded as being modified by a modification group, or an ion having maximum intensity in the $MS^n$ spectrum.

13. A diagnosis system using the mass spectrometric system according to claim 10.

14. The diagnosis system according to claim 13, wherein said diagnosis system includes one or more internal databases in which information of ion species designated in advance and spectrum patterns obtained from the ion species are stored.

15. The diagnosis system according to claim 14, wherein said means for determining as to whether said spectra match uses, as said internal databases, both or one of a database storing information of spectra obtained from samples extracted from healthy persons and a database storing information of spectra obtained from samples extracted from diseased persons.

16. An inspection system using the mass spectrometric system according to claim 10.

17. The inspection system according to claim 16, wherein said inspection system includes one or more internal databases in which information of ion species designated in advance and spectrum patterns obtained from the ion species are stored.

18. The inspection system according to claim 17, wherein determination as to a match of spectrum pattern is made using, as said internal databases, both or one of a database storing information of spectra obtained from reference samples and a database storing information of spectra obtained from particular samples designated by an operator.

* * * * *

UNITED STATES PATENT AND TRADEMARK OFFICE

CERTIFICATE OF CORRECTION

PATENT NO. : 7,595,484 B2
APPLICATION NO. : 11/315162
DATED : September 29, 2009
INVENTOR(S) : Yokosuka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this

Twenty-eighth Day of September, 2010

David J. Kappos
*Director of the United States Patent and Trademark Office*